March 22, 1932.  G. A. VAUGHN  1,850,363
TRENCH EXCAVATOR CONSTRUCTION
Filed July 16, 1930   3 Sheets-Sheet 1
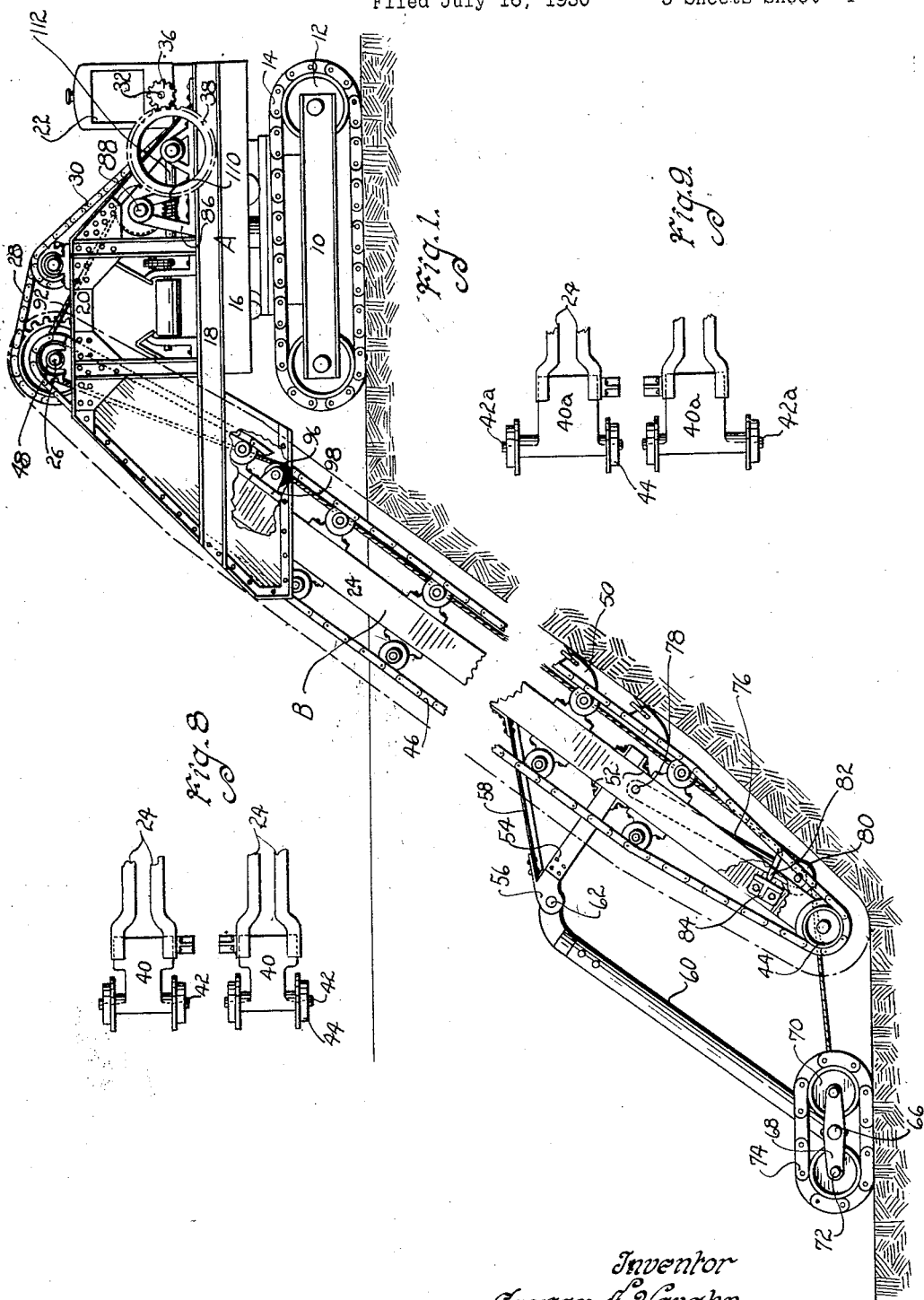
Inventor
George A. Vaughn
by Bair, Freeman & Sinclair
Attorneys
Witness
Edw. Seeley

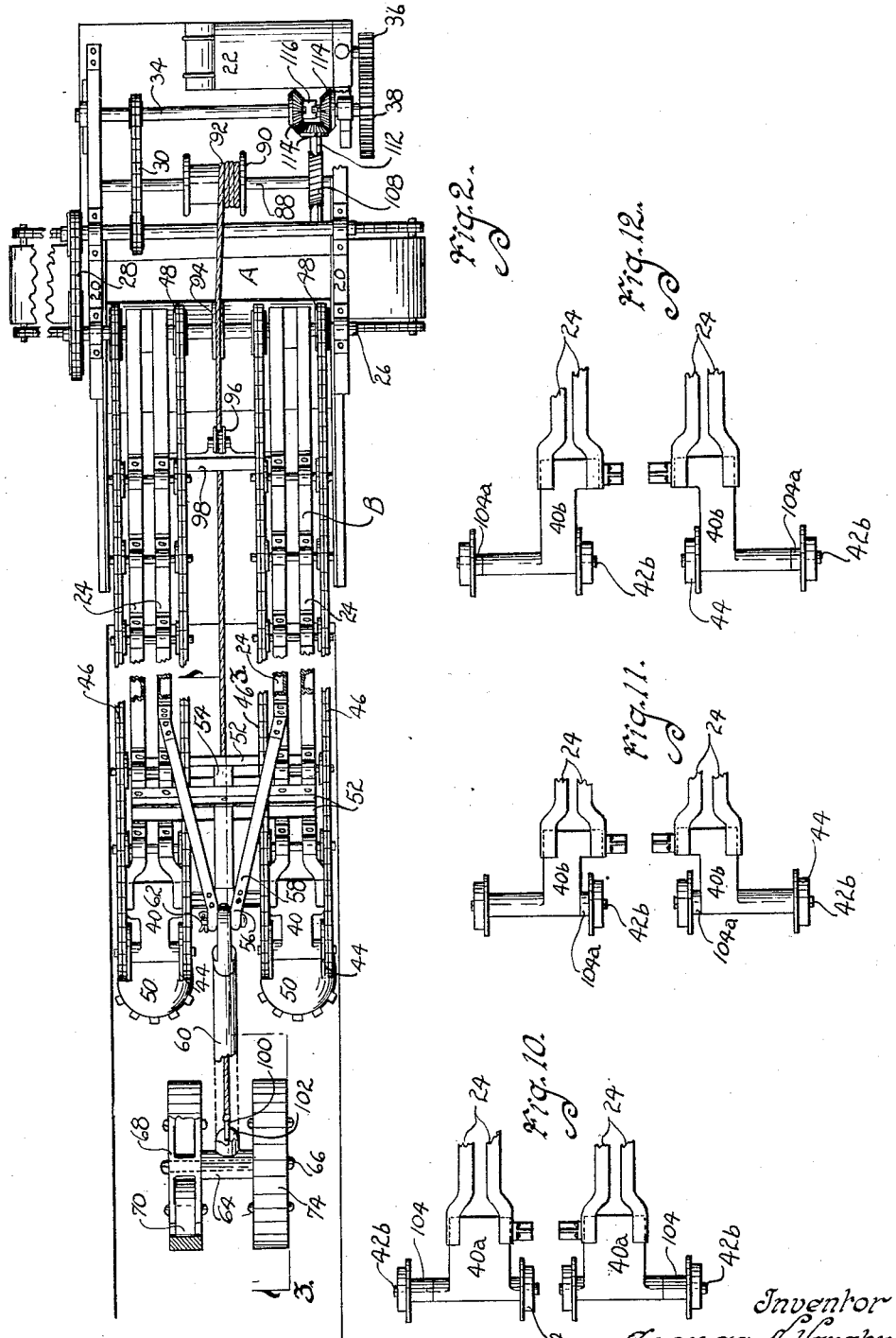

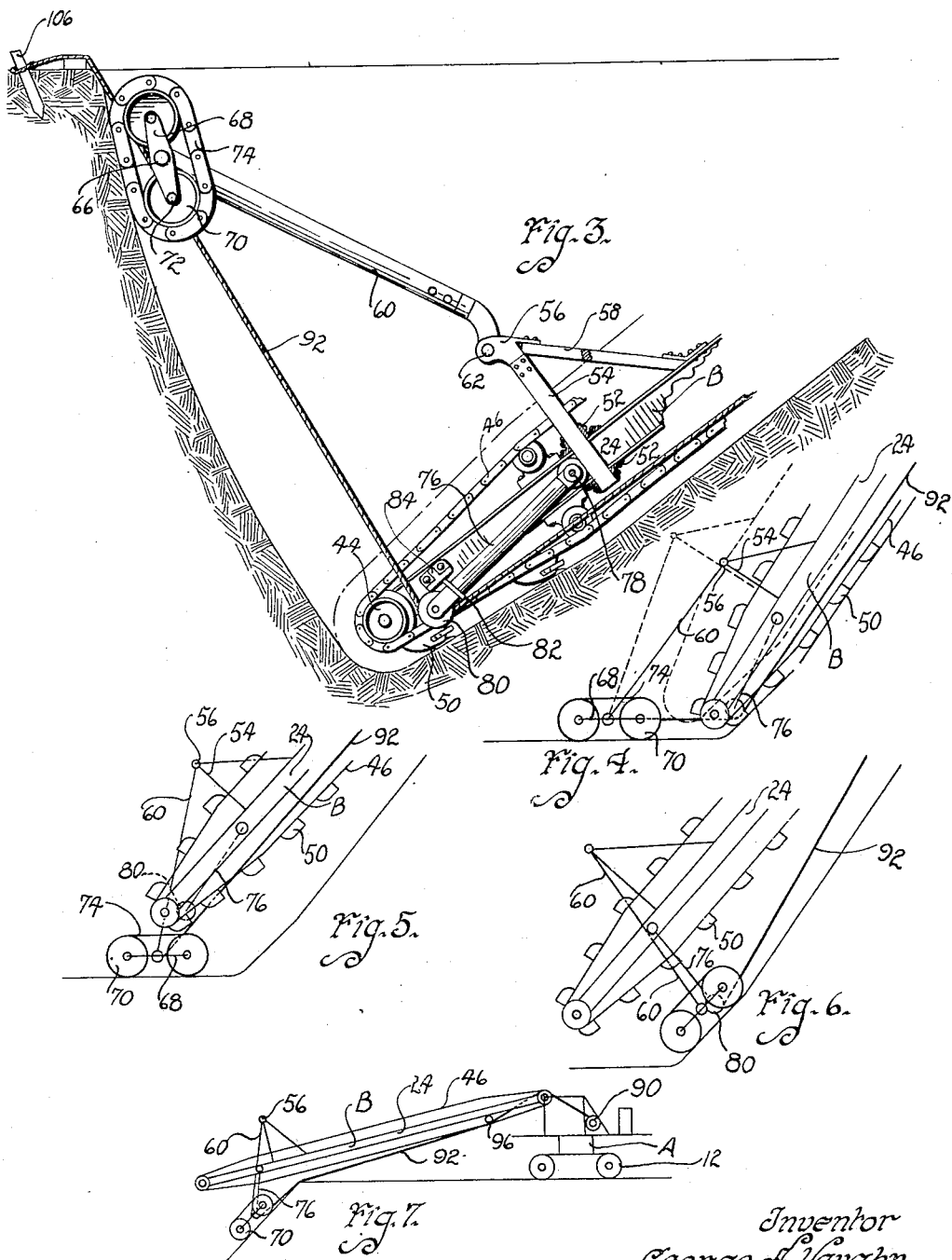

Patented Mar. 22, 1932

1,850,363

UNITED STATES PATENT OFFICE

GEORGE A. VAUGHN, OF NEWTON, IOWA, ASSIGNOR TO THE PARSONS COMPANY, OF NEWTON, IOWA, A CORPORATION OF IOWA

TRENCH EXCAVATOR CONSTRUCTION

Application filed July 16, 1930. Serial No. 468,320.

The object of my invention is to provide a trench excavator construction of simple, durable and comparatively inexpensive construction.

More particularly, it is my object to provide a construction of this character, comprising a comparatively short tractor unit, having a comparatively long excavator boom for the digging of deep trenches, and a trailer device for supporting the trailing end of the excavator boom, both when moving from one position to another and when excavating a trench.

Another object is to provide in connection with an excavator boom, a trailer consisting of a small carriage, preferably of the caterpillar type, having a supporting arm pivoted thereto and pivoted to the excavator boom, whereby pivotal adjustment of one relative to the other may be had for regulating the depth of cut of the excavator or for elevating the boom to a position above the ground suitable for moving from one place to another.

Another object is to provide a trailer drum and rope for adjusting the trailer relative to the boom.

Still another object is to provide a pivoted pulley arm mounted on the boom and coactable with the supporting arm of the trailer for adjusting the trailer to a trailing position.

Another object is to provide a trailer rope, which may in some instances be used with its end connected to a stake or "dead man" for initially lowering the boom into a trench started by the boom itself.

Still another object is to provide fittings for the lower end of the boom, whereby the same boom and chains with wide excavator buckets can be utilized for making wider trenches.

With these and other objects in view, my invention consists in the construction, arrangement and combination of the various parts of my trench excavator construction, whereby the objects contemplated are attained, as hereinafter more fully set forth, pointed out in my claims, and illustrated in the accompanying drawings, in which:

Figure 1 is a side elevation of my improved type of excavator boom construction showing it in operation for digging a trench.

Figure 2 is a plan view of the same.

Figure 3 is a central, sectional view on the line 3—3 of Figure 2, showing the lower end of the boom as when lowered into a trench.

Figures 4, 5 and 6 are diagrammatic views showing the same parts illustrated in Figure 3 with the trailer in different positions with respect to the excavator boom for adjusting the cut of the excavator for raising the excavator boom relative to the trailer and for pulling the excavator boom out of a trench respectively.

Figure 7 is a full diagrammatic view showing the tractor unit boom and trailer being used to pull the excavator boom out of a trench, which has been finished and onto the ground surface for traveling.

Figure 8 is a plan view of portions of the lower end of the boom, showing the wheels over which the excavator chains travel.

Figure 9 is a similar view showing different parts to be substituted for supporting the shaft of the excavator chain wheels, so that wider excavator buckets can be used for forming a wider trench; and Figures 10, 11 and 12 are similar views illustrating parts used for making the trench still wider.

In the accompanying drawings, I have used the reference character A to indicate generally a tractor unit. The under frame of the tractor unit A is indicated generally at 10.

Caterpillar wheels 12 are journaled relative to the frame 10 and a caterpillar tread 14 travels over the wheels 12.

The upper frame of the tractor unit A is indicated at 16. The frame 16 is rotatably mounted relative to the frame 10. Supported on the upper frame 16 is a pair of side frames 18, having upstanding parts 20 for supporting the excavator boom B and other working parts.

A suitable motor or engine 22 is provided for operating the excavator.

The excavator boom B consists of two pairs of boom members 24 pivoted on a drive shaft 26. The drive shaft 26 is driven through the medium of chains 28 and 30, together with other suitable gearing devices and clutches from the shaft 32 of the engine 22.

The gearing connections between the shaft 32 and a shaft 34 is made by means of a pinion 36 and a gear 38. The boom members 24 have secured to their lower ends tail blocks 40. A shaft 42 is mounted in each tail block 40 and carries excavator chain wheels 44 of the flanged type. Excavator chains 46 travel over these wheels and over excavator chain sprockets 48 secured to the drive shaft 26. Excavator buckets 50 are secured to each pair of chains 46. The two pairs of boom members 24 are connected by cross members 52 adjacent their lower ends.

An upright 54 is secured between the cross members 52 and terminates in a head 56. Brace members 58 are provided for making the head 56 rigid relative to the boom 8.

A supporting arm 60 is pivoted at 62 to the head 56 and has at its lower end a transverse boss 64.

A trailer shaft 66 extends through the boss 64 and has a double forked arm 68 on each of its ends. Wheels 70 are journaled in the forked arms 68 on shafts 72 carried thereby.

Caterpillar tread devices 74 extend around the wheels 70.

From the construction of the parts just described, it will be seen that the trailer device, consisting of the wheels 70, caterpillar treads 74, forked arms 68, and shaft 66, is mounted on the lower end of the supporting arm 60, which in itself is also pivotally mounted with respect to the boom B.

A pulley arm 76 is pivoted on a shaft 78 extending from one side of the boom B to the other. The pulley arm 76 has a pulley 80 journaled in its lower end. A wide flange 82 is formed on the lower end of the pulley arm 76 and is adapted to engage a pair of stop lugs 84, extending from the two side members of the boom B.

The supporting arm 60 is adapted to pass between the stop lugs 84.

Suitably journaled in bearings 86 on the upper frame 16 of the tractor unit A is a trailer drum shaft 88. A drum 90 is mounted on the shaft 88 and a trailer cable 92 is wound on the drum 90. The cable 92 extends up over a loose pulley 94 on the drive shaft 26, then under a pulley 96 supported on a cross bar 98, secured to the boom B, then over the pulley 80 on the lower end of the pulley arm 76, and terminates in a hook 100 adapted to be hooked in an eye 102, formed on the hub 64 of the trailer.

In Figures 2 and 8, I have illustrated the tail blocks 40 as being centrally located with respect to the boom members 24, whereby excavator buckets 50 of a predetermined width may be used for making a comparatively narrow trench.

In Figure 9, I illustrate substitute tail blocks 40a, which may be used with wider buckets and longer shafts 42a for making a wider trench.

Figure 10 shows a collar 104 which can be used with the tail blocks 40a and a longer shaft 42 for making a still wider trench.

In Figure 11, a pair of tail blocks 40b can be used with a short sleeve 104a and the same shafts 42b for making a still wider trench.

It will be noted that the character of the tail blocks 40b is such that it makes a wider space between the two rows of excavator buckets, and yet the same shaft as in Figure 10 can be used.

In Figure 12, the shaft 42b is again used and so are the tail blocks 40b. The collar 104a however is placed in a different position for making the trench wider and still using the same buckets, as in Figures 10 and 11.

*Practical operation*

In the operation of my device, let us first refer to Figure 3. In this figure, the trailer cable 92 is disconnected from the trailer and connected with a stake or "dead man" 106.

When a trench is started, the trailer is left to travel free behind the excavator boom, and the excavator boom is left on the ground and will cut its way downwardly as it is free to pivot on the drive shaft 26.

The weight of the boom, however, causes it to cut its face for the capacity of the engine 22, and the cable 92 is accordingly secured to the stake 106, which may be driven in the ground at any suitable point.

The cable may then be slowly unwound from the drum 90 so as to give the proper speed of cut, as the excavator boom lowers. During the lowering operation the trailer will fall down the back of the trench, as shown in Figure 3.

When the proper depth has been cut, the hook 100 is hooked in the eye 102 of the trailer and the machine is advanced for cutting the trench through the ground.

The cable 92 is gradually tightened until the trailer comes to the bottom of the trench, as shown in Figure 1, and the trailer is then left in this position. When in such position, the trailer acts as a supoprt for the excavator boom and keeps the boom at a predetermined depth below the surface of the ground, regardless of whether or not the surface of the ground is level.

When it is desired to cut a little shallower, the boom may be lifted from the position shown in Figures 1 and 4 to the dotted line position shown in Figure 4 by tightening the cable 92. This will cause the trench to become shallower and by a reverse adjustment, the trench can be made deeper.

It will be noted that the digging buckets will cut only part of the ditch because of their spaced positions relative to each other and in actual practice the wall of earth left between them crumbles away and falls into the buckets.

When the trench is finished and it is desired to remove the boom from the trench, the cable 92 is tightened until the parts assume the position shown in Figure 5, in which the supporting arm 60 contacts with the pulley 80 on the pulley arm 76. Further tightening of the cable 92 will pull the parts to the position shown in Figure 6 for raising the boom a considerable distance above the trailer.

The tractor unit may now be driven forwardly and the trailer will act as a support for the lower end of the boom, while coming out of the trench as shown in Figure 7.

Thereafter the device may be driven from one place to another with the trailer supporting the rear end of the boom.

For operating the trailer drum 90, any suitable mechanism may be provided, and I have shown by way of illustration a worm gear 108, meshing with a worm 110 on a shaft 112. The shaft 112 is connected by beveled gears 114 and a clutch 116 with the shaft 34. Thus by shifting the clutch 116, the cable 92 may be either loosened or tightened as required.

Some changes may be made in the arrangement and construction of the various parts of my trench excavator construction without departing from the real spirit and purpose of my invention, and it is my intention to cover by my claims, any modified forms of structure or use of mechanical equivalents, which may be reasonably included within their scope.

I claim as my invention:

1. In an excavator, a tractor unit, a boom having one end supported thereby and a trailer for supporting the other end thereof, a supporting arm pivotally connected to said boom, said trailer being secured thereto and said arm being movable with respect to said boom for assuming positions across the boom or substantially parallel therewith for supporting the boom in either an inoperative or an operative position respectively.

2. In an excavator structure, a tractor unit, a boom having one end supported thereby, a supporting arm having one end pivoted adjacent the other end of said boom, and a trailer on the free end of said supporting arm, said trailer comprising a frame pivoted on the supporting arm, and a pair of wheels carried by said frame.

3. In an excavator structure, a tractor unit, a boom having one end supported thereby, a supporting arm having one end pivoted adjacent the other end of said boom, a trailer on the free end of said supporting arm, said trailer comprising a frame pivoted on the supporting arm, a pair of wheels carried by said frame, and a caterpillar tread over said wheels.

4. In an excavator structure, a tractor unit, a boom having one end supported thereby, a supporting arm having one end pivoted adjacent the other end of said boom, a trailer on the free end of said supporting arm, a cable drum on said tractor unit, and a cable from said drum to said trailer.

5. In an excavator structure, a tractor unit, a boom having one end supported thereby, a supporting arm having one end pivoted adjacent the other end of said boom, a trailer on the free end of said supporting arm, a cable drum on said tractor unit, a pivoted pulley arm on said boom, a pulley on said pulley arm and a cable from said drum, over said pulley, and to said trailer.

6. In an excavator structure, a tractor unit, a boom having one end supported thereby, a supporting arm having one end pivoted adjacent the other end of said boom, a trailer on the free end of said supporting arm, a cable drum on said tractor unit, a pivoted pulley arm on said boom, a pulley on said pulley arm, and a cable from said drum, over said pulley, and to said trailer, said boom having a stop for said pulley arm to engage.

7. In an excavator structure, a tractor unit, a boom having one end supported thereby, a supporting arm having one end pivoted adjacent the other end of said boom, a trailer on the free end of said supporting arm, a cable drum on said tractor unit, a pivoted pulley arm on said boom, a pulley on said pulley arm, and a cable from said drum, over said pulley, and to said trailer, said boom having a stop for said pulley arm to engage, said supporting arm being engageable with said pulley arm whereby swinging movement can be transmitted to both arms during predetermined adjustments of said cable.

8. In an excavator structure, a tractor unit, a boom having one end supported thereby, a supporting arm having one end pivoted adjacent the other end of said boom, a trailer on the free end of said supporting arm, a cable drum on said tractor unit, a pivoted pulley arm on said boom, a pulley on said pulley arm and a cable from said drum, over said pulley, and to said trailer, said cable being detachable from said trailer and attachable to a stationary object.

9. In an excavator structure, a tractor unit, a boom having one end supported thereby, a frame extending outwardly from said boom at a position adjacent the free end thereof, a supporting arm having one end pivoted to the outer end of said frame, and a trailer on the free end of said supporting arm.

10. In an excavator structure, a tractor unit, a boom having one end supported thereby, a frame extending outwardly from said boom at a position adjacent the free end thereof, a supporting arm having one end pivoted to the outer end of said frame, a trailer on the free end of said supporting arm, a pulley arm having one end pivoted to said boom, a pulley on its free end, a cable extending from said trailer, over said pulley, and to said tractor unit, and means on the tractor unit for adjusting said cable.

11. In an excavator structure, a tractor unit, a boom having one end supported thereby, a supporting arm having one end pivotally connected to said boom, a trailer on the free end of said supporting arm and means controlled from said tractor unit for fixing the position of said supporting arm relative to said boom.

12. In an excavator structure, a tractor unit, a boom having one end supported thereby, a frame extending outwardly from said boom, a supporting arm having one end pivoted to the outer end of said frame, a trailer on the free end of said supporting arm and means for fixing the position of said supporting arm relative to said frame.

Des Moines, Iowa, September 26, 1929.

GEORGE A. VAUGHN.